(12) United States Patent
Winokur

(10) Patent No.: US 7,707,453 B2
(45) Date of Patent: Apr. 27, 2010

(54) REMOTE DATA MIRRORING SYSTEM

(75) Inventor: Alex Winokur, Haifa (IL)

(73) Assignee: Axxana (Israel) Ltd., Tel Aviv (IL)

( * ) Notice: Subject to any disclaimer, the term of this patent is extended or adjusted under 35 U.S.C. 154(b) by 243 days.

(21) Appl. No.: 10/585,587

(22) PCT Filed: Apr. 10, 2006

(86) PCT No.: PCT/IL2006/000453

§ 371 (c)(1),
(2), (4) Date: Jul. 10, 2006

(87) PCT Pub. No.: WO2006/111958

PCT Pub. Date: Oct. 26, 2006

(65) Prior Publication Data

US 2009/0216969 A1    Aug. 27, 2009

Related U.S. Application Data

(60) Provisional application No. 60/673,664, filed on Apr. 20, 2005, provisional application No. 60/729,112, filed on Oct. 20, 2005.

(51) Int. Cl.
*G06F 11/00* (2006.01)
(52) U.S. Cl. .............................. 714/6; 714/4; 711/161; 711/162
(58) Field of Classification Search ..................... 714/4, 714/6; 711/161, 162
See application file for complete search history.

(56) References Cited

U.S. PATENT DOCUMENTS

| | | | |
|---|---|---|---|
| 5,594,900 A | | 1/1997 | Cohn et al. |
| 5,623,597 A | * | 4/1997 | Kikinis ......................... 726/18 |
| 5,799,141 A | * | 8/1998 | Galipeau et al. ............... 714/13 |
| 5,841,768 A | * | 11/1998 | Ozluturk et al. ............. 370/335 |
| 5,889,935 A | | 3/1999 | Ofek et al. |
| 6,105,078 A | * | 8/2000 | Crockett et al. ............... 710/18 |

(Continued)

FOREIGN PATENT DOCUMENTS

CN    1495612    5/2004

(Continued)

OTHER PUBLICATIONS

International Application PCT/IL2006/000453 International Preliminary Report on Patentability dated Nov. 1, 2007.

(Continued)

*Primary Examiner*—Emerson C Puente
(74) *Attorney, Agent, or Firm*—D. Kligler I.P. Services Ltd

(57) ABSTRACT

A method for data protection includes accepting data for storage from one or more data sources (24). The data is sent for storage in a primary storage device (28) and in a secondary storage device (32). While awaiting an indication of successful storage of the data in the secondary storage device, a record associated with the data is temporarily stored in a disaster-proof storage unit (48) adjacent to the primary storage device. When an event damaging at least some of the data in the primary storage device occurs, the data is reconstructed using the record stored in the disaster-proof storage unit and at least part of the data stored in the secondary storage device.

35 Claims, 6 Drawing Sheets

U.S. PATENT DOCUMENTS

| | | | |
|---|---|---|---|
| 6,144,999 A * | 11/2000 | Khalidi et al. | 709/219 |
| 6,158,833 A * | 12/2000 | Engler | 312/409 |
| 6,226,651 B1 | 5/2001 | Masuda et al. | |
| 6,260,125 B1 * | 7/2001 | McDowell | 711/162 |
| 6,324,654 B1 * | 11/2001 | Wahl et al. | 714/6 |
| 6,389,552 B1 | 5/2002 | Hamilton et al. | |
| 7,055,056 B2 | 5/2003 | Bessire | |
| 6,842,825 B2 | 1/2005 | Geiner et al. | |
| 6,859,865 B2 | 2/2005 | De Margerie et al. | |
| 6,976,186 B1 * | 12/2005 | Gardner | 714/4 |
| 7,148,802 B2 * | 12/2006 | Abbruscato | 340/539.13 |
| 7,185,228 B2 * | 2/2007 | Achiwa | 714/20 |
| 7,188,292 B2 * | 3/2007 | Cordina et al. | 714/748 |
| 7,383,405 B2 * | 6/2008 | Vega et al. | 711/162 |
| 7,478,266 B2 * | 1/2009 | Gatto et al. | 714/5 |
| 7,487,311 B2 * | 2/2009 | Stroberger et al. | 711/162 |
| 2001/0047412 A1 | 11/2001 | Weinman | |
| 2003/0014523 A1 | 1/2003 | Teloh et al. | |
| 2003/0204597 A1 | 10/2003 | Arakawa et al. | |
| 2004/0030837 A1 | 2/2004 | Geiner et al. | |
| 2004/0059844 A1 | 3/2004 | Jones et al. | |
| 2004/0230352 A1 * | 11/2004 | Monroe | 701/3 |
| 2005/0005001 A1 * | 1/2005 | Hara et al. | 709/221 |
| 2005/0243609 A1 | 11/2005 | Yang et al. | |
| 2005/0280421 A1 * | 12/2005 | Yomoda et al. | 324/350 |
| 2006/0075148 A1 * | 4/2006 | Osaki | 710/5 |
| 2007/0094467 A1 | 4/2007 | Yamasaki | |
| 2007/0198613 A1 | 8/2007 | Prahlad et al. | |
| 2008/0001128 A1 | 1/2008 | Goldberg | |
| 2008/0104443 A1 | 5/2008 | Akutsu et al. | |
| 2009/0094425 A1 * | 4/2009 | Winokur | 711/161 |

FOREIGN PATENT DOCUMENTS

| | | |
|---|---|---|
| EP | 0420425 A2 | 4/1991 |
| EP | 1559449 | 8/2005 |
| WO | 01/97030 A1 | 12/2001 |
| WO | WO-2006111958 | 10/2006 |
| WO | WO-2008049703 | 5/2008 |

OTHER PUBLICATIONS

International Application No. PCT/IL2008/001052 Search Report dated Nov. 19, 2008.
Chinese Patent Application No. 200680017546.1 Official Action dated Dec. 26, 2008.
Goldfire Ltd., Technology and Solutions Developed for Our Clients, Brussels, Belgium 2008 http://www.goldfire.be/en/index.html.
Firetrust, "FireTrust Technology", Brussels, Belgium 2008 http://www.firetrust.eu/en/index.html.
International Application No. PCT/IL06/00453 Search Report dated Mar. 9, 2007.
http://www.emc.com/products/networking/srdf.jsp—Sep. 6, 2006.
http://www-03.ibm.com/servers/storage/solutions/—Sep. 6, 2006.
European Patent Application No. 06728254.1 Official Action dated Sep. 3, 2009.
International Application PCT/IB2009/051919 Search Report dated Oct. 16, 2009.
Russian Patent Application No. 2007141777 Official Action dated May 6, 2009.
European Patent Application No. 06728254.1 Supplementary Search Report dated Aug. 19, 2009.

* cited by examiner

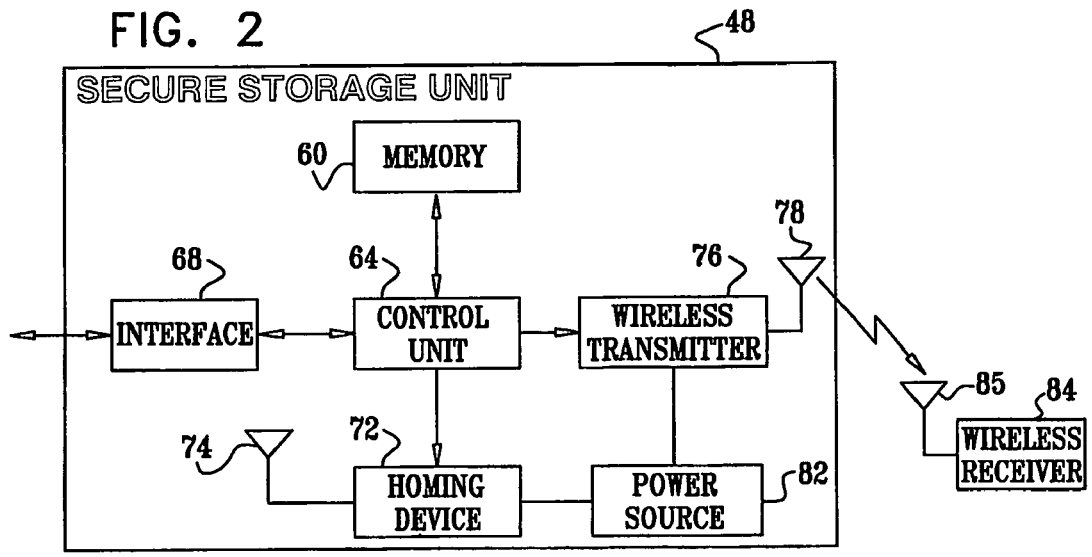
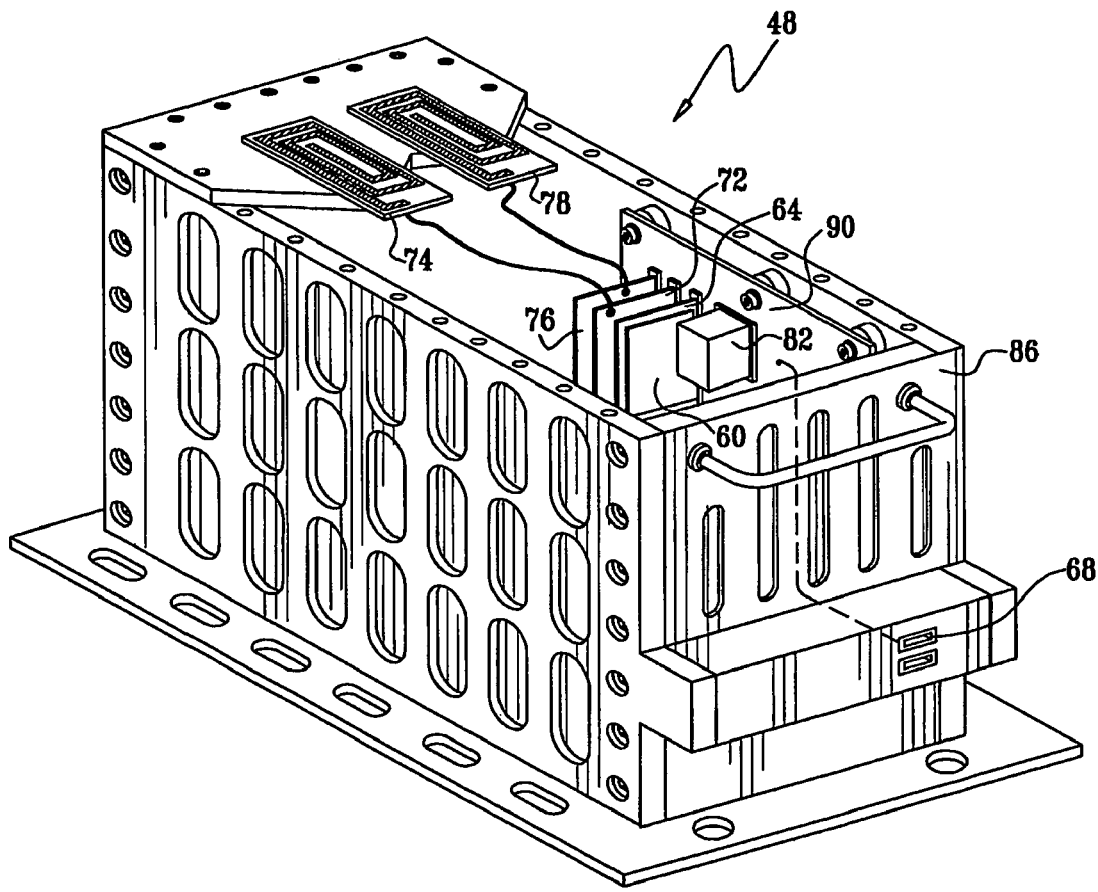

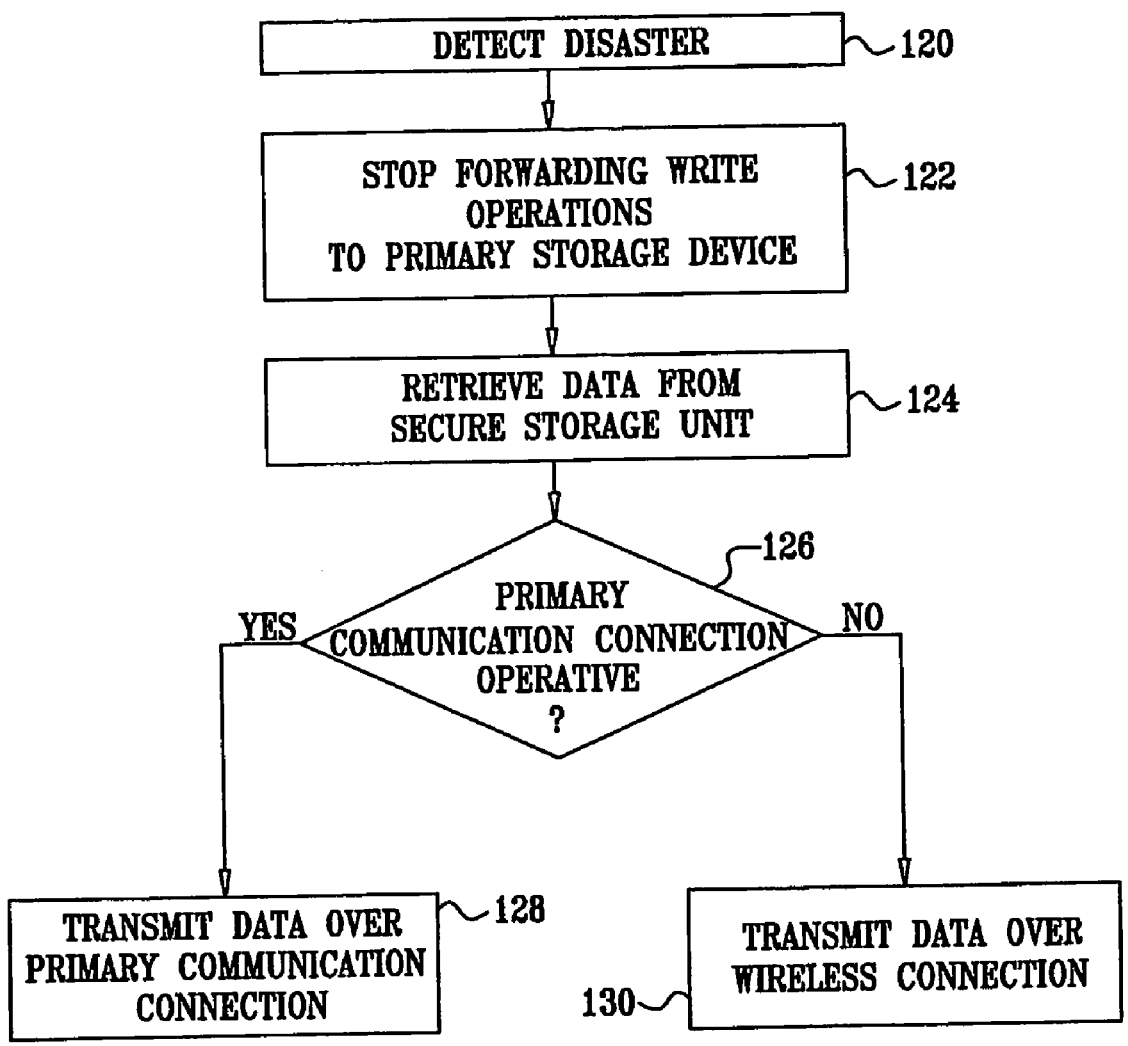

REMOTE DATA MIRRORING SYSTEM

CROSS-REFERENCE TO PRIOR APPLICATION

The above-referenced application is the U.S. National Phase of International Patent Application No. PCT/IL2006/000453, filed Apr. 10, 2006, which claims priority from U.S. Provisional Application Nos. 60/673,664, filed Apr. 20, 2005 and 60/729,112, filed Oct. 20, 2005, which are incorporated by reference herein.

FIELD OF THE INVENTION

The present invention relates generally to data protection systems, and particularly to methods and systems for protecting mirrored data against disaster events using disaster-proof temporary storage devices.

BACKGROUND OF THE INVENTION

Various methods and systems are known in the art for protecting data in computer systems against disasters such as earthquakes, storms, floods, fires and terrorist attacks. Some solutions involve replicating (mirroring) the data in a primary and a secondary storage device.

For example, EMC Corporation (Hopkinton, Mass.) offers a family of remote storage replication solutions called Symmetrix Remote Data Facility (SRDF) for disaster recovery and business continuity. The SRDF product family includes both synchronous and asynchronous solutions. Further details regarding the SRDF products are available at www.emc.com/products/networking/srdf.jsp.

As another example, IBM Corporation (Armonk, N.Y.) offers a number of business continuity solutions, including mirroring products. Further details regarding these products are available at www-03.ibm.com/servers/storage/solutions/business_continuity.

SUMMARY OF THE INVENTION

Some known data protection applications use synchronous mirroring methods, in which a transaction is considered complete only after both primary and secondary storage devices successfully store the data. This requirement introduces significant latency into the transaction, in particular when the secondary site is located far away from the primary site. In some cases, the maximum tolerable latency limits the maximum separation between the primary and secondary sites.

In order to reduce the transaction latency and enable large separation between the primary and secondary sites, some known data protection applications use asynchronous mirroring methods, in which the transaction is acknowledged as soon as the data is successfully stored in the primary storage device. The interaction with the secondary storage device may be continued in parallel. However, asynchronous mirroring does not provide guaranteed storage of the data in the secondary storage device, and in some cases data may be lost in the event of disaster.

In view of these shortcomings of synchronous and asynchronous mirroring methods, embodiments of the present invention provide improved methods and systems for data protection. The methods, systems and devices described hereinbelow enable guaranteed low latency data mirroring at both primary and secondary storage devices, regardless of the latency and/or separation between the storage devices. The data to be protected may be received from one or more data sources, such as information technology (IT), telephony, security and surveillance systems.

In some embodiments, data is sent for storage in primary and secondary storage devices. A record related to the data is temporarily cached in a secure storage device until the data is successfully stored in the secondary storage device. In some embodiments, the secure storage device is constructed so as to withstand disaster events while protecting the cached data. In the context of the present patent application and in the claims, a storage device is considered to be "disaster-proof" if it is designed so that the data it stores will, with high probability, remain intact and fully recoverable even under conditions typical of disaster events, such as the events listed above and similar events. Such conditions may cause destruction of computer equipment or data stored in such equipment in proximity to the storage device.

If an event affecting at least some of the data occurs, the secure storage device is recovered and the records cached in it are used to reconstruct the data in the secondary storage devices.

In some embodiments, the data protection system uses one or more environmental sensors for early detection of a developing or approaching disaster event. Methods for further improving data protection using early disaster detection are described hereinbelow.

There is therefore provided, in accordance with an embodiment of the present invention, a method for data protection, including:

accepting data for storage from one or more data sources;

sending the data for storage in a primary storage device and in a secondary storage device;

while awaiting an indication of successful storage of the data in the secondary storage device, temporarily storing a record associated with the data in a disaster-proof storage unit adjacent to the primary storage device; and when an event damaging at least some of the data in the primary storage device occurs, reconstructing the data using the record stored in the disaster-proof storage unit and at least part of the data stored in the secondary storage device.

In an embodiment, temporarily storing the record includes sending an acknowledgement to the one or more data sources responsively to a successful caching of the record in the disaster-proof storage unit, without waiting to receive the indication of the successful storage of the data in the secondary storage device, so as to reduce a transaction latency associated with the storage of the data.

Additionally or alternatively, temporarily storing the record includes receiving an acknowledgement from the secondary storage device acknowledging the successful storage of the data in the secondary storage device, and deleting the record from the disaster-proof storage unit responsively to the acknowledgement.

In another embodiment, reconstructing the data includes retrieving the disaster-proof storage unit following the event, extracting the record from the disaster-proof storage unit and writing the data associated with the record to the secondary storage device. Writing the data may include remotely connecting the disaster-proof storage unit to the secondary storage device.

In yet another embodiment, the disaster-proof storage unit includes a removable memory device for holding the record, and reconstructing the data includes, when the disaster-proof storage unit is damaged by the event, removing the memory device from the disaster-proof storage unit and installing the memory device in another unit for readout of the record.

In still another embodiment, the method includes detecting the event using a detection mechanism in the disaster-proof storage unit, and modifying operation of the disaster-proof storage unit responsively to detecting the event. Detecting the event may include detecting at least one of a loss of external electrical power supply and a communication failure at the disaster-proof storage unit. In an embodiment, modifying the operation includes transmitting the record from the disaster-proof storage unit over a wireless communication link.

In another embodiment, temporarily storing the record includes storing the record in two or more disaster-proof storage units, and transmitting the record includes transmitting two or more different parts of the record respectively from the two or more disaster-proof storage units over respective wireless links so as to shorten a transmission time of the record.

In yet another embodiment, modifying the operation includes transmitting a homing signal from the disaster-proof storage unit, so as to enable location and retrieval of the disaster-proof storage unit.

In an embodiment, reconstructing the data includes:

sensing an environmental condition using an environmental sensor;

predicting the event responsively to the sensed environmental condition; and after predicting the event, transmitting the record from the disaster-proof storage unit using at least one of a wired connection and a wireless connection.

Sensing the environmental condition may include accepting a manual indication from a user that indicates the event.

In an embodiment, temporarily storing the record includes sending an acknowledgement message responsively to a successful storage of the record in the disaster-proof storage unit, and, after predicting the event, refraining from sending subsequent acknowledgement messages so as to avoid accepting additional data from the one or more data sources.

In another embodiment, after predicting the event, the method includes refraining from sending subsequent data for storage in the primary storage device. Additionally or alternatively, after predicting the event, the method includes temporarily storing in the disaster-proof storage unit only subsequent records associated with data originating from a subset of the one or more data sources.

In still another embodiment, temporarily storing the record includes avoiding exceeding a memory capacity in the disaster-proof storage unit by matching the memory capacity with at least one of a maximum allowed size of data pending for acknowledgement by the secondary storage device and a maximum number of write commands pending for storage in the secondary storage device.

Additionally or alternatively, temporarily storing the record includes including in the record additional information related to the data, the additional information includes at least one of an address of an originating data source, an address of the primary storage device, a time stamp indicating an acceptance time of the data and a storage address intended for the data in the primary storage device.

There is additionally provided, in accordance with an embodiment of the present invention, a method for data protection, including:

accepting data for storage from one or more data sources;

sending the data for storage in a storage device;

temporarily storing records associated with at least part of the data that is relevant to investigation of disaster events in a disaster-proof storage unit; and when an event damaging at least some of the data in the storage device occurs, investigating the event using the records stored in the disaster-proof storage unit.

In an embodiment, the at least part of the data that is relevant to investigation of disaster events includes at least one of surveillance images, access control information and data originating from a telephony system. Additionally or alternatively, the at least part of the data that is relevant to investigation of disaster events includes data accepted at a time immediately preceding an occurrence of the event.

There is also provided, in accordance with an embodiment of the present invention, a method for data protection, including:

accepting data from a data source for storage in a primary storage device;

periodically sending the data for backup in a backup storage device by means of a sequence of backup operations;

temporarily storing in a disaster-proof storage unit records associated with at least part of the data that is accepted during a time interval between successive backup operations in the sequence; and when an event damaging at least some of the data in the primary storage device occurs during the time interval, reconstructing the data using the records stored in the disaster-proof storage unit.

There is further provided, in accordance with an embodiment of the present invention, a method for data protection, including:

accepting data for storage from a data source;

sending the data for storage in a primary storage device, while mirroring the data in a secondary storage device;

temporarily storing at least part of the data in a disaster-proof storage unit at a site of the primary storage device; and when an event damaging at least some of the data in the primary storage device occurs at the site, reconstructing the data using the at least part of the data stored in the disaster-proof storage unit.

There is also provided, in accordance with an embodiment of the present invention, a system for data protection, including:

one or more data sources, which are arranged to send data for storage;

primary and secondary storage devices, which are arranged to hold the data;

a disaster-proof storage unit adjacent to the primary storage device, which is arranged to temporarily store a record associated with the data while awaiting an indication of a successful storage of the data in the secondary storage device, and when an event damaging at least some of the data in the primary storage device occurs, to provide the record so as to enable reconstruction of the data using the record stored in the disaster-proof storage unit and at least part of the data stored in the secondary storage device.

In an embodiment, the system includes:

an environmental sensor, which is arranged to sense an environmental condition in a vicinity of the primary storage device; and a processor, which is arranged to predict the event responsively to the sensed environmental condition and, after predicting the event, to instruct the disaster-proof storage unit to transmit the record using at least one of a wired connection and a wireless connection.

There is additionally provided, in accordance with an embodiment of the present invention, apparatus for protecting data sent for storage in primary and secondary storage devices, including:

a disaster-proof storage unit, which includes:

a disaster-proof enclosure, which is arranged to protect components contained therein against disaster events;

a memory device contained in the enclosure, which is arranged to temporarily hold a record associated with the data while awaiting an indication of successful storage of the data in the secondary storage device; and a control unit, which is arranged, when an event damaging at least some of the data in the primary storage device occurs, to provide the record so as to enable reconstruction of the data using the record stored in the memory device and at least part of the data stored in the secondary storage device;

a sensor, which is arranged to sense an environmental condition in a vicinity of the primary storage device; and a protection processor, which is arranged to predict the event responsively to the sensed environmental condition and, responsively to predicting the event, to instruct the disaster-proof storage unit to transmit the record so as to protect the data.

There is also provided, in accordance with an embodiment of the present invention, a computer software product for data protection, the product including a computer-readable medium, in which program instructions are stored, which instructions, when read by a computer, cause the computer to accept data from one or more data sources sent for storage in primary and secondary storage devices, and to temporarily store a record associated with the data in a disaster-proof storage unit adjacent to the primary storage device, while awaiting an indication of successful storage of the data in the secondary storage device.

The present invention will be more fully understood from the following detailed description of the embodiments thereof, taken together with the drawings in which:

BRIEF DESCRIPTION OF THE DRAWINGS

FIG. 2 is a block diagram that schematically illustrates a secure storage unit, in accordance with an embodiment of the present invention;

FIG. 3 is a schematic, pictorial illustration of a secure storage unit, in accordance with an embodiment of the present invention; and FIGS. 4 and 5 are flow charts that schematically illustrate methods for data protection, in accordance with embodiments of the present invention.

DETAILED DESCRIPTION OF EMBODIMENTS

Figure 1A:
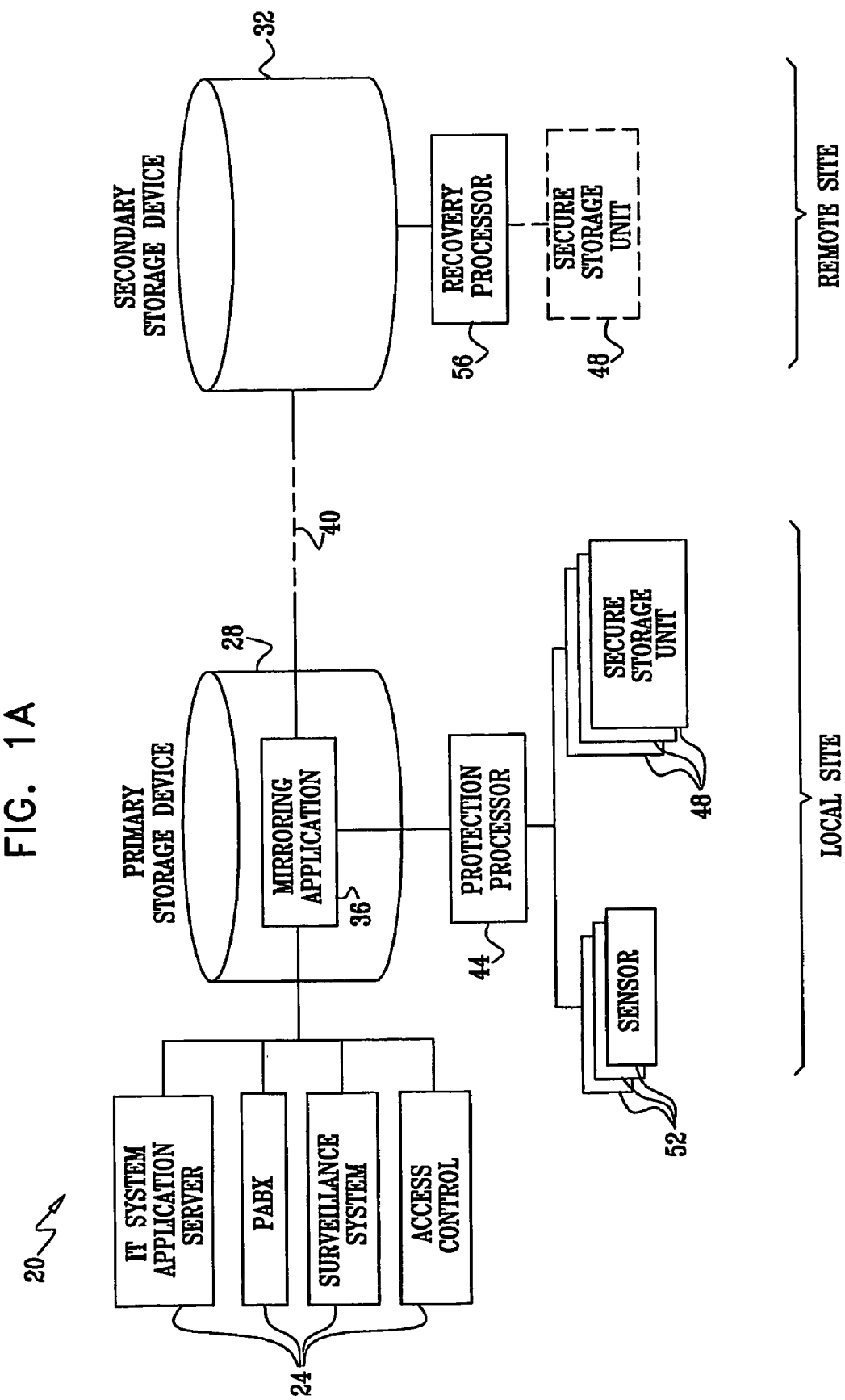
FIGS. 1A-1C are block diagrams that schematically illustrate systems for data protection, in accordance with embodiments of the present invention.

In a typical synchronous mirroring transaction, a mirroring application accepts a write command from a requesting application. The command typically comprises a storage instruction indicating data to be stored and the memory location in which to store it. In response, the mirroring application issues write commands to both the primary and secondary storage devices. The mirroring application waits until both storage devices store the data. Only when acknowledgements are received from both storage devices, the mirroring application acknowledges the write command to the requesting application, and only then the command is considered successful.

On one hand, synchronous mirroring methods offer a high level of reliability because they guarantee that the data is successfully stored in both storage devices before the write command is regarded as completed. On the other hand, the latency associated with synchronous write operations is often problematic, in particular when the secondary storage device is located far away from the mirroring application. (In the description that follows, it is assumed that the primary storage device and the mirroring application are both located at a primary site adjacent to the requesting application. The secondary storage device is assumed to be located at a distant, secondary site. Although this configuration is common in many practical systems, the embodiments described hereinbelow may be adapted for use in any other geographical layout of the system, as well.)

Since, in a synchronic transaction, the requesting application does not receive an acknowledgement of the write command until an acknowledgement is received from the secondary storage device, the entire transaction is delayed by at least the round-trip propagation delay between the mirroring application and the secondary site.

In many practical cases, the secondary storage device is located hundreds of miles away from the primary site. Moreover, the communication path connecting the mirroring application with the secondary storage device may comprise various network elements, links and other communication media which introduce additional latency. Acknowledgement mechanisms in the communication protocols used further increase the latency. In some cases, the overall round-trip delay can reach one minute or more. Such latency often degrades the system performance, and may be prohibitive in some applications. In some cases, the maximum latency that can be tolerated limits the distance between the primary and secondary site, thereby degrading the disaster resilience of the system.

In order to overcome the latency and distance limitations associated with synchronous mirroring, some known data protection methods use asynchronous mirroring methods. In a typical asynchronous mirroring transaction, the requesting application issues a write command to the mirroring application. The mirroring application sends a write command to the primary storage device, and in addition caches the command in its local memory. As soon as the mirroring application receives an acknowledgment from the primary storage device, it acknowledges the successful completion of the operation to the requesting application, and the command is considered successful. At some stage of the process, the mirroring application sends a write command to the secondary storage device. When the secondary storage device performs and acknowledges the command, the mirroring application deletes the cached command from its local memory.

In an asynchronous transaction, only the latency associated with the primary storage device is felt by the requesting application. The interaction between the mirroring application and the secondary storage device often occurs after the requesting application has already received an acknowledgement and has considered the write operation successfully completed.

Thus, when using asynchronous mirroring, the transaction latency is not affected by the distance to the secondary storage device, enabling any distance to be used. On the other hand, asynchronous mirroring does not offer guaranteed storage at both storage devices. If a disaster event occurs before the interaction with the secondary storage device is completed, the last write commands to the secondary storage device may be lost. In other words, all the data for which an acknowledgement was received from the primary storage device, but not from the secondary storage device, is assumed to be lost.

In view of the shortcomings of synchronous and asynchronous mirroring methods, as described above, embodiments of the present invention provide improved methods and systems for data protection. The methods, systems and devices described hereinbelow enable guaranteed low latency data mirroring at both storage devices, regardless of the distance and/or latency associated with storage in the secondary storage device.

System Description

FIG. 1A is a block diagram that schematically illustrates a system 20 for protecting data of an organization against disaster events, in accordance with an embodiment of the present invention. Disaster events may comprise any event that affects the organization, and in particular the data storage of the organization. A disaster event may comprise, for example, an earthquake, a storm, a fire, a flood or a terrorist attack. In some cases, a system failure, such as a computer system failure or a power outage that affects the data storage of the organization, can also be regarded as a disaster event.

Different organizations have different data types that should be protected in the event of a disaster. For example, an information technology (IT) system may use and/or produce data that is valuable to the organization. Additionally or alternatively, data produced by various systems in the organization can be valuable for investigating the disaster event. For example, the source, destination and/or contents of telephone conversations held immediately before or during the disaster may prove valuable. As another example, information gathered from security and surveillance systems before and during a terrorist attack, such as video images and data acquired by access control systems may also be considered valuable.

System 20 stores data produced and/or used by one or more data sources 24. In some embodiments, data sources 24 may comprise, for example, an application server of an information technology (IT) system of the organization, a telephony system such as a Private Automatic Branch Exchange (PABX) or telephony switch, a surveillance system of the organization such as a closed-circuit television (CCTV) system, an access control system, and/or any other system that produces data.

In order to protect the data, system 20 mirrors (i.e., replicates) the data and stores it in two or more storage devices. In some embodiments, system 20 comprises a primary storage device 28 and a secondary storage device 32. The two storage devices hold replicas of the organization data, in a configuration commonly known as a mirrored configuration. Storage devices 28 and 32 may comprise disks, magnetic tapes, computer memory devices, and/or devices based on any other suitable storage technology. In some embodiments, the storage devices comprise internal processors that perform local data storage and retrieval-related functions. Although the description that follows refers to two storage devices, other implementations of system 20 may comprise a higher number of storage devices. System 20 can be implemented using only a single storage device, for example for protecting the data acquired from security systems immediately before a terrorist attack.

Typically, the primary and secondary storage devices are physically located at two separate sites. The sites are chosen to be sufficiently distant from one another, so that a disaster event in one of the sites will be unlikely to affect the other. In some embodiments, regulatory restrictions recommend a separation greater than 200 miles, although any other suitable distance can also be used. In the example of FIG. 1A, the primary storage device is collocated with the data sources at a local site, and the secondary storage device is located at a remote site.

A mirroring application 36 performs mirroring of the data, i.e., stores replicas of the data produced by data sources 24 in the primary and the secondary storage devices. Typically, the mirroring application accepts write commands from data sources 24, the commands comprising or pointing to data to be stored. The mirroring application stores the data in the primary and secondary storage devices, using methods which will be described below. In the exemplary embodiment of FIG. 1A, the mirroring application runs on the CPU of the primary storage device. Alternatively, application 36 may run on a separate processor.

In some embodiments, the mirroring application acknowledges each write command to the originating data source 24 when it receives an acknowledgement from the primary storage device, without waiting for a similar acknowledgement from the secondary storage device. Unlike known asynchronous mirroring methods, in order to ensure that no data is lost until it is safely stored in the secondary storage device as well, the mirroring application sends the data for temporary storage in one or more secure storage units 48.

Figure 1B:
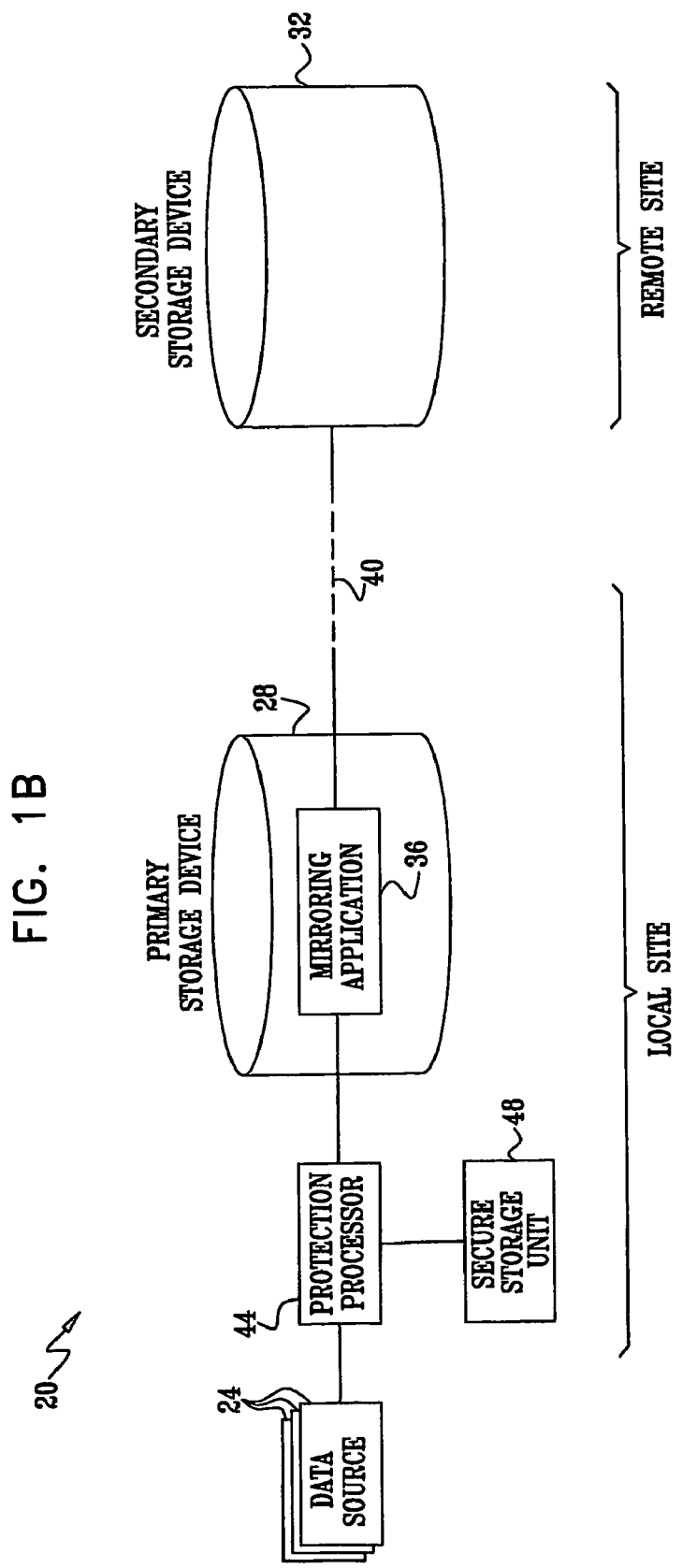
Figure 1C:
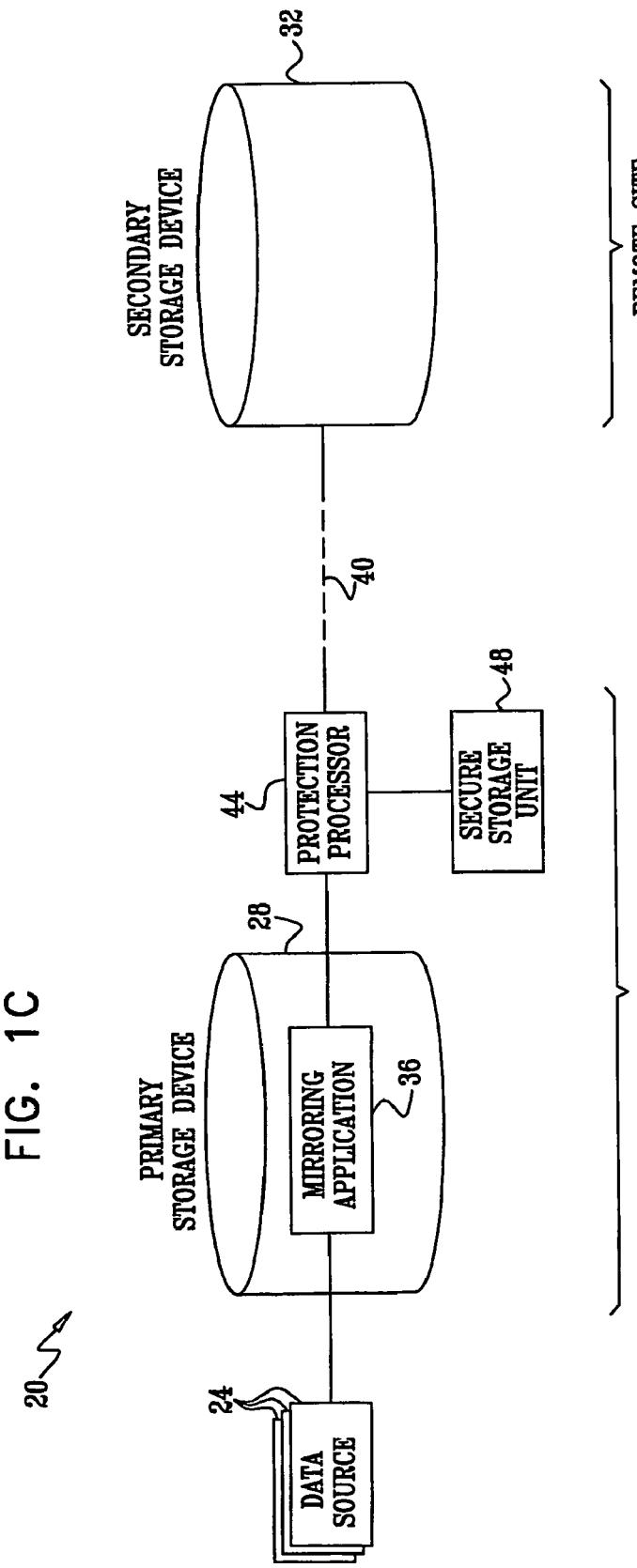

In some embodiments, a protection processor 44 is connected to mirroring application 36. (In the description that follows, the term "connected to the mirroring application" is used to describe a connection for the exchange of data and control information with the processor or computing platform running the mirroring application, whether the same as or separate from the processor of the primary storage device.) In the exemplary system configuration of FIG. 1A, processor 44 emulates an additional storage device connected to a port of mirroring application 36. Alternative system configurations are shown in FIGS. 1B and 1C below.

Processor 44 communicates with application 36 using a suitable communication link, such as an optical fiber link, an Internet Protocol (IP) link or a bus such as a peripheral component interconnect (PCI) bus. In order to enable small transaction latency, processor 44 is typically located adjacent to the mirroring application. The mirroring application is typically configured to forward every write command it accepts, as well as any acknowledgments it receives, to processor 44. Processor 44 may communicate with application 36 using any suitable protocol, such as the small computer systems interface (SCSI), network file system (NFS) and common internet file system (CIFS) protocols, which are commonly used for communication between servers and storage devices.

Typically, processor 44 comprises a general-purpose computer, which is programmed in software to carry out the functions described herein. The software may be downloaded to the computer in electronic form, over a network, for example, or it may alternatively be supplied to the computer on tangible media, such as CD-ROM. In some embodiments, processor 44 may be implemented internally to the primary storage device.

Processor 44 is connected to one or more secure storage units 48. In some embodiments, two or more units 48 are deployed at different locations at or around the primary site, so as to increase the probability that a least one of them will survive a disaster event. Typically, for every write operation sent or to be sent to secondary storage device 32, processor 44 stores a respective record in each of units 48. The record is cached in units 48 until an acknowledgement indicating successful storage is received from device 32. Once an acknowledgement of a particular write command is received from the secondary storage device, processor 44 deletes the corresponding record from units 48. Processor 44 may communicate with units 48 using any suitable interface, such as a universal serial bus (USB) interface. In some embodiments, units 48 are mapped as virtual storage drives of processor 44. In some embodiments, the communication interface also provides electrical power for powering the secure storage units.

In some embodiments, units 48 are constructed in a durable manner, so as to enable them to withstand disaster events while protecting the cached data. An exemplary mechanical construction of a secure storage unit is shown in FIG. 3 below.

After a disaster event hits the primary site, at least one of the secure storage units is retrieved. The records stored in the retrieved units are used to reconstruct the data in the secondary storage device. In some embodiments, a recovery processor 56 is connected to the secondary storage device. A retrieved secure storage unit is connected to the recovery processor. The recovery processor extracts the records stored in the unit and uses them to reconstruct the data in the secondary storage device. Unlike known mirroring methods in which all the data located in the primary site is assumed to be destroyed by the disaster event, the records stored in units 48, at or adjacent to the primary site, survive and are used to reconstruct the data following the event.

As can be appreciated, the use of secure storage units 48 enables system 20 to provide low latency write commands, regardless of the distance to the secondary storage device. At the same time, the system provides guaranteed mirroring of the data at both storage devices. Typically, the data can be recovered and reconstructed within a relatively short time frame after retrieving at least one operational unit 48.

In some cases, some of the records stored in the retrieved unit 48 correspond to data that was only assumed to be lost, but in reality was written successfully to the secondary storage device. In most practical cases, however, no further action is required since rewriting data that already exists in the storage device does not affect the consistency of the data.

In some embodiments, the operation of the protection processor and secure storage units is transparent to the mirroring application and to the data sources. Thus, processor 44 and units 48 can be installed as an add-on to a known mirroring application or other data protection system.

In order to provide a high level of protection and reliability, it is desirable to avoid overflow in memory 60 of unit 48, so that records are not lost. Generally, a record can be safely deleted from unit 48 when the corresponding write command has been successfully carried out by the secondary storage device. There are several alternative methods of indicating to protection processor 44 when it is permitted to delete a record from unit 48, sometimes depending on the functionality of the mirroring application.

In some embodiments, protection processor 44 may listen to the acknowledgement messages arriving from the secondary storage device. When an acknowledgement of a particular write command is received by processor 44, the processor deletes the corresponding record from unit 48. However, in some system configurations it is complicated or otherwise undesirable to intercept the acknowledgement messages by processor 44.

Alternatively, it is sometimes possible to avoid overflow in unit 48 by duplicating the overflow avoidance policy of the mirroring application, without explicitly listening to the acknowledgement messages sent from the secondary storage device. For example, some mirroring applications manage a finite size buffer of pending write commands, i.e., write commands that were sent to the secondary storage device but are not yet acknowledged. When this buffer is full, the mirroring application refuses to accept additional write commands from the data sources. In these embodiments, memory 60 of unit 48 can be dimensioned to hold at least the same number of records as the maximum number of write commands in the mirroring application buffer. Similarly, given a particular unit 48 having a certain memory size, the mirroring application can be configured so that its buffer size matches the size of memory 60. Because the size of memory 60 and the size of the mirroring application buffer are matched, when a new write command is sent to processor 44, the oldest record in unit 48 can be safely deleted.

Other mirroring applications are configured to allow a maximum number of pending write commands, without necessarily holding a buffer. In other words, the mirroring application tracks the number of write commands sent to the secondary storage device and the number of acknowledgements received, and maintains a current count of unacknowledged (i.e., pending) write commands. When the number of pending write commands reaches a predetermined limit, no additional write commands are accepted from the data sources. In these embodiments, the size of memory 60 can be dimensioned to match the maximum number of pending write commands. Alternatively, the mirroring application can be configured so that the maximum allowed number of pending write commands matches the size of memory 60.

Additionally or alternatively, any other suitable mechanism can be used to avoid overflow in memory 60 by matching the size of memory 60 with the maximum size of data pending to be acknowledged by the secondary storage device.

In some embodiments, the data can be reconstructed quickly, without physically connecting the retrieved unit 48 directly to the recovery processor at the secondary storage site. Such embodiments may be useful, for example, in situations in which the secondary site is far away from the primary site (from which unit 48 was retrieved). In these embodiments, the retrieved unit 48 is connected to a remote computer (not shown in the figure), which is remotely connected to recovery processor 56 using any suitable communication link, such as over the Internet. The records stored in the retrieved unit are then transmitted via the remote computer to the recovery processor.

In some embodiments, the records transmitted between the remote computer and the recovery processor are encrypted, so as to maintain data security when communicating over wireless channels and over public media such as the Internet. Typically, the records are already encrypted by protection processor 44 before they are stored in unit 48. Any software needed for extracting and/or transmitting the records may be stored in the memory of unit 48 along with the records, so that any computer having Internet access (or other access means) and a suitable interface for connecting to unit 48 can be used as a remote computer.

In some embodiments, one or more environmental sensors 52 are installed at or near the primary storage device and connected to protection processor 44. The sensors are used for sensing environmental conditions, which may provide early detection, or prediction, of a developing disaster event. For example, sensors 52 may comprise temperature sensors that sense a rising temperature at or near the primary storage device. Additionally or alternatively, sensors 52 may comprise seismographic sensors that sense the vibrations associated with a developing earthquake. In some embodiments, one of sensors 52 may comprise a manual switch or other input device that enables a user to manually indicate an approaching disaster to the protection processor. The input device may be located at the primary site, at the secondary site or at any other suitable location. Further additionally or alternatively, sensors 52 may comprise any other suitable sensor type that enables early prediction of developing disaster conditions. In some embodiments, system 20 uses the early disaster detection to further improve the protection of the data. An exemplary method for data protection that uses early disaster detection is shown in FIG. 5 below.

FIGS. 1B and 1C are block diagrams that schematically illustrate alternative configurations of system 20, in accordance with embodiments of the present invention. In the configuration of FIG. 1B, protection processor 44 is introduced in-band, in the communication link connecting data sources 24 with mirroring application 36. In this embodiment, all write commands from the data sources pass through processor 44. In the configuration of FIG. 1C, the protection processor is inserted in communication link 40 connecting the mirroring application and the secondary storage device. In this configuration, mirroring application 36 performs synchronous mirroring to protection processor 44, and processor 44 performs asynchronous mirroring to secondary storage device 32. Note that only one secure storage unit 48 is shown in FIGS. 1B and 1C, and that sensors 52 and recovery processor 56 are omitted from these figures. These omissions are intended purely for the sake of simplicity, and any or all of these elements may be included in any of the system configurations, as appropriate.

The system configurations of FIGS. 1A-1C are exemplary configurations. Other configurations will be apparent to those skilled in the art. For example, mirroring application 36 may be integrated with protection processor 44 on a single computing platform. In some embodiments, one or more secure storage units 48 can be used to protect the data of a single storage device, with no mirroring application. As another example, the functions of protection processor 44 and secure storage unit 48 can be carried out by a single disaster-proof unit, which may also carry out the functions of mirroring application 36. The combined unit may be constructed, for example, as a disaster-proof drawer or rack in the primary site, or as a durable enclosure similar to the configuration of FIG. 3 below.

The configurations of FIGS. 1A-1C also present several alternatives of synchronous and asynchronous mirroring protocols. For example, in FIG. 1A, mirroring application 36 may perform synchronous mirroring to protection processor 44, and asynchronous mirroring to secondary storage device 32. In FIG. 1C, however, the mirroring application performs synchronous mirroring to protection processor 44, and processor 44 performs asynchronous mirroring to the secondary storage device.

FIG. 2 is a block diagram that schematically illustrates secure storage unit 48, in accordance with an embodiment of the present invention. Unit 48 comprises a memory 60, which holds records corresponding to write commands, as described above. Memory 60 may comprise, for example, a non-volatile memory device such as a flash device or an electrically erasable programmable read only memory (EEPROM) device. Alternatively, memory 60 may comprise any other suitable non-volatile or battery-backed memory device. Memory 60 may comprise one or more memory devices.

Unit 48 comprises a control unit 64, which performs the various data storage and management functions of secure storage unit 48. Control unit 64 may comprise a microprocessor running suitable software. Alternatively, control unit 64 may be implemented in hardware, or using a combination of hardware and software elements. An interface circuit 68, such as a USB interface circuit, handles the physical interface between unit 48 and application 36. In embodiments in which supply voltage is provided to unit 48 from protection processor 44, circuit 68 provides this voltage to the various elements of unit 48.

In some embodiments, unit 48 comprises a homing device 72, coupled to a homing antenna 74. Homing device 72 comprises a transmitter or transponder, which transmits a radio frequency (RF) homing signal in order to enable unit 48 to be located and retrieved following a disaster event. Typically, homing device 72 begins to operate when unit 48 detects that a disaster event occurred.

In some embodiments, control unit 64 of unit 48 comprises a detection mechanism that detects disaster events. For example, the detection mechanism may detect the absence of electrical power and/or communication with processor 44, conclude that a disaster even occurred, and as a result activate homing device 72. Device 72 may comprise an active, passive or semi-active homing device.

In some embodiments, homing device 72 is powered by a power source 82. Power source 82 may comprise a rechargeable battery, which is charged by electrical power provided via interface 68 during normal system operation. Alternatively, power source 82 may comprise any other suitable battery. In some embodiments, power source 82 is used to power control unit 64 and/or memory 60.

In some embodiments, unit 48 comprises a wireless transmitter 76 coupled to a communication antenna 78. Transmitter 76 is typically powered by power source 82.

Transmitter 76 is used for transmitting the records stored in memory 60 to a wireless receiver 84, when the communication between unit 48 and processor 44 is broken due to a disaster event. As such, transmitter 76 and antenna 78 serve as alternative communication means for transmitting information from unit 48. Using the wireless channel, data stored in the secure storage unit can be retrieved and reconstructed within minutes. The other retrieval methods, which involve physically locating and retrieving the secure storage unit and may involve detaching memory 60 from the unit, may sometimes take several hours or even days.

Transmitter 76 may comprise, for example, a cellular transmitter, a WiMax transmitter, or any other suitable data transmitter type. Wireless receiver 84 is coupled to a receiving antenna 85. Receiver 84 and antenna 85 may be connected to secondary storage device 32 or to recovery processor 56. An exemplary data protection method that uses the alternative communication link is shown in FIG. 5 below.

In some embodiments in which two or more secure storage units are used in a redundant configuration, such as in the configuration of FIG. 1A above, the wireless transmitter in each unit 48 is typically assigned a different communication channel so as to avoid collisions among the transmissions of neighboring wireless transmitters. Additionally or alternatively, similar channel coordination may be performed for the homing devices 72 of neighboring units 48.

In order to shorten the time needed for transferring the data over the wireless channel, receiver 84 may be configured to receive two or more wireless channels in parallel. When the two or more secure storage units begin transmitting, the receiver may choose to receive these transmissions simultaneously, thus receiving different parts of the data from each of the secure storage units.

When two or more secure storage units 48 are used, different transmitters 76 in different units 48 may be configured to transmit on different networks (e.g., cellular networks of different service providers). This network diversity increases the likelihood of successful data transfer even when a particular wireless network fails during the disaster.

In some embodiments, the functions of homing device 72, transmitter 76, and antennas 74 and 78 can be performed by a single transmitter and a single antenna. For example, several methods are known in the art for determining the position of a cellular transmitter. Such methods can be used to locate wireless transmitter 76 when it transmits data from unit 48, thus eliminating the need for a separate homing device.

FIG. 3 is a schematic, pictorial illustration of secure storage unit 48, in accordance with an embodiment of the present invention. In the exemplary mechanical configuration of FIG. 3, unit 48 is packaged in a reinforced, disaster-proof enclosure 86. In some embodiments, enclosure 86 may comprise a hermetically-sealed, fire-proof, vibration/shock-proof, lightning-proof, radiation-proof, vandal-proof and/or water resistant enclosure. As noted above, in some embodiments system 20 comprises two or more such units 48, in order to increase the probability of at least one unit surviving the disaster event.

Interface circuit 68, in this embodiment comprising a USB connector, is shown on the front panel of the unit. Control unit 64, homing device 72 and transmitter 76 are assembled on three printed circuit boards (PCB), mounted on a motherboard 90. Memory 60 in the present example in mounted on the PCB of control unit 64. Power source 82, in the present example comprising a battery, is mounted on motherboard 90 adjacent to the PCBs. Antennas 74 and 78 are shown mounted on the top panel. The mechanical outline of FIG. 3 is shown purely as an exemplary configuration. Any other suitable mechanical and/or electrical configuration can also be used.

In some scenarios, a disaster event may damage unit 48 and prevent its connection to the recovery machine, even though the data stored in memory 60 is unharmed. For example, the USB connector may be damaged. In order to enable access to the data, in some embodiments, memory 60 (and possibly additional elements of unit 48) is made easily detachable from enclosure 86. In these embodiments, memory 60 can be easily removed and mounted in another unit 48. Then, the unit can be connected to the recovery processor and its data retrieved. For example, memory 60 may comprise a removable memory card inserted into a suitable socket in unit 48, such as is used in digital cameras.

Additionally or alternatively, homing device 72 and/or transmitter 76 can be assembled as detachable units, so that these units can be replaced to suit different communication standards, local frequency allocations and/or other regulatory constraints.

In some embodiments, antenna 74 and/or antenna 78 is normally folded or otherwise fitted inside enclosure 86, so as to reduce its exposure to the disaster event. In these embodiments, only after the disaster event is detected, the antenna is unfolded or otherwise extended out of enclosure 86 to enable transmission. Further additionally or alternatively, any other suitable configuration of unit 48 can be used. As previously noted, the disaster event can be detected by control unit 64 by detecting a loss of communication and/or electrical power.

Protection Method Descriptions

Figure 4:
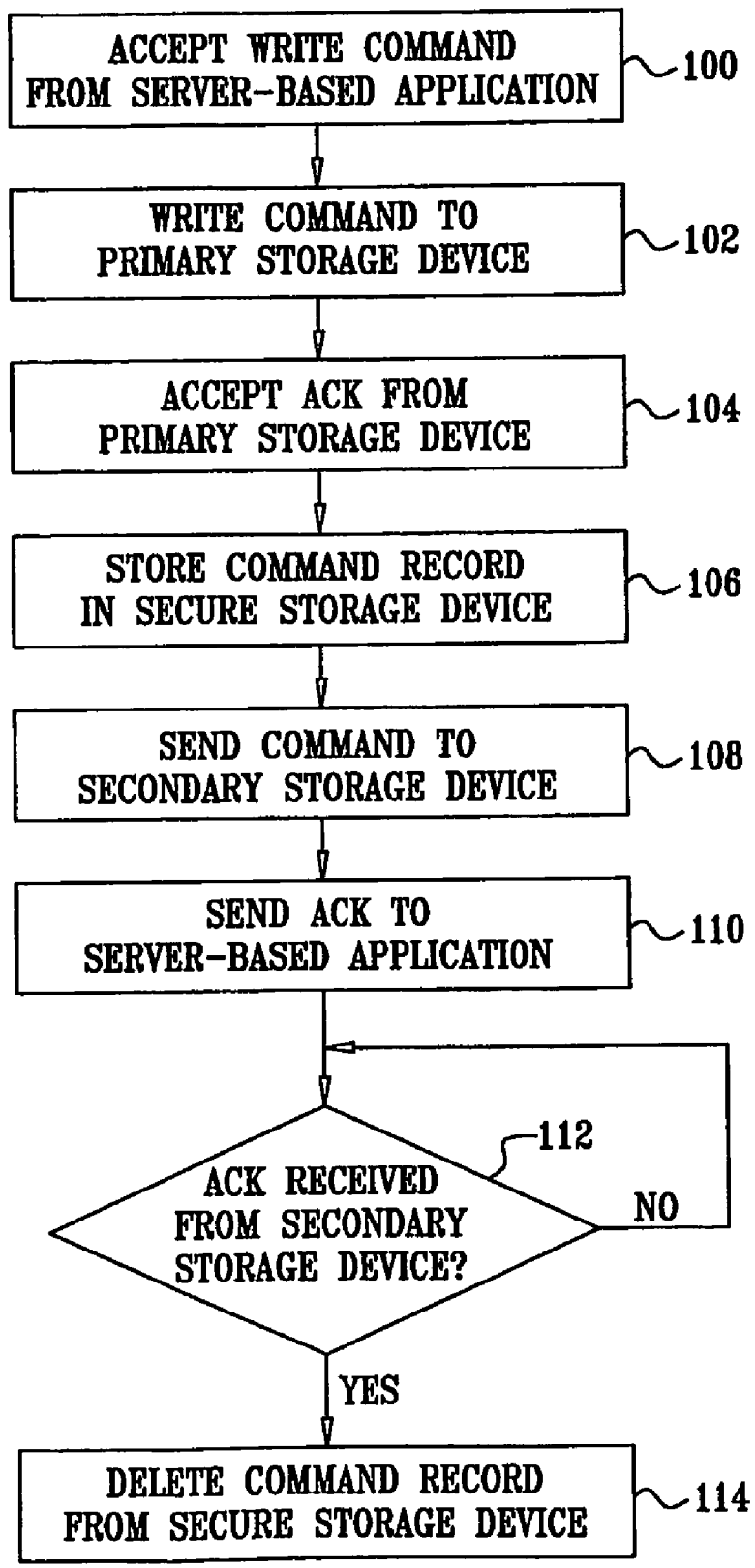

FIG. 4 is a flow chart that schematically illustrates a method for data protection, in accordance with an embodiment of the present invention. The description below outlines a typical transaction in which data is replicated and stored in the primary and secondary storage devices. In order to ensure guaranteed storage in the secondary storage device, the data is temporarily cached in secure storage devices 48.

The method begins with mirroring application 36 accepting a write command from one of data sources 24, in the present example a server-based IT application, at a command acceptance step 100. The write command comprises data to be stored. The mirroring application sends the data to primary storage device 28, at a primary sending step 102. After the primary storage device successfully stores the data, it sends an acknowledgement back to the mirroring application. The mirroring application accepts the acknowledgement, at a primary acknowledgement reception step 104.

Protection processor 44 accepts the write command and stores it in one or more of secure storage devices 48, at a secure caching step 106. Depending on the system configuration used, processor 44 either intercepts the write commands sent over communication link 40, monitors the communication between mirroring application and the data sources, or receives all write commands by forwarding from the mirroring application. After accepting the write command, processor 44 produces a respective record and stores the record in the secure storage devices. The secure storage devices typically acknowledge the successful completion of the storage operation.

In some embodiments, in addition to the data to be stored, the record comprises additional information. Such additional information may comprise, for example, a communication address of the data source that originated the write command, a communication address of the primary storage device, a time stamp indicating the time in which the write command was accepted, a storage address in the primary storage device intended for the data, and/or any additional parameters associated with the write command.

Before, during or after the temporary storage of the record in units 48, the mirroring application sends the data for storage in secondary storage device 32, at a secondary sending step 108. Provided that the records are successfully stored in units 48, the mirroring application sends an acknowledgement to the originating data source 24, at an asynchronous acknowledgement step 110.

Processor 44 checks whether an acknowledgement from the secondary storage device was received, at a secondary acknowledgement checking step 112. Until such acknowledgement is received, processor 44 maintains the respective record cached in secure storage units 48, possibly handling other write commands meanwhile. When an acknowledgement is received from secondary storage device 32, processor 44 deletes the respective record from units 48, at a record deletion step 114.

The sequence of steps 100-114 above describes the processing of a single write command. Typically, mirroring application 36 and protection processor 44 simultaneously process multiple such sequences corresponding to multiple write commands. In some embodiments, the sequence of steps above can be carried out in different orders. For example, once a write command is received by the mirroring application, the data can be sent to the primary and secondary storage devices, and only then a record may be stored in units 48. Some of the steps can be carried out in parallel. For example, storing the write command in the secure storage unit can be performed in parallel to sending the command to the primary and/or secondary storage device.

In some embodiments, the data protection method carried out by processor 44 is described by the following pseudo-code:

FOR every write operation received from a data source DO
  {Allocate a buffer frame within memory 60 of units 48 and
    return a pointer to this buffer denoted BufferFrame.
    Write the corresponding record to the buffer pointed to
      by BufferFrame.}

Of course, memory 60 in units 48 has a finite size and can only accommodate a finite number of records. In some embodiments, before storing a newly-created record, processor 44 checks whether sufficient memory space is available in memory 60 to hold the new record. If insufficient memory is available, processor 44 deletes one or more previous records from memory 60 in order to free memory space for the new record. In some embodiments, the processor deletes the oldest records in memory 60. In some embodiments, the memory management process carried out by processor 44 can be described by the following pseudo-code:

```
IF free buffer entries within memory 60 exist THEN
    {Allocate a free entry buffer for new record. Return pointer
        BufferFrame pointing to the free buffer.}
ELSE
    {Locate record X having data which resides in memory 60
        for the longest period of time.
    Discard record X from memory 60.
    Allocate a free buffer entry to new record.
    Return BufferFrame pointing to free buffer entry}
```

When performing recovery of the data using the records stored in units 60, the data recovery process can be described by the following pseudo-code:

```
FOR the data in each record stored in memory 60
DO
    {Read the data of each record in the order in which it was
        originally stored.
        Based on the storage address in the record, write the data
            to the appropriate address in the secondary storage
            device.}
```

FIG. 5 is a flow chart that schematically illustrates a method for data protection using early disaster detection, in accordance with another embodiment of the present invention. The method begins with protection processor 44 predicting a developing or approaching disaster event (or a manual activation by a user), at an early detection step 120. In some embodiments, processor 44 analyzes the environmental conditions sensed by sensors 52, as described above, and detects a developing disaster event responsively to the sensed conditions.

When a developing disaster event is detected, processor 44 instructs the mirroring application to stop forwarding write commands to the primary storage device, at a write rejection step 122. Stopping the write operations is particularly important in earthquake conditions, since performing write operations in the presence of mechanical shocks and vibrations may be harmful to the storage device.

Since processor 44 predicts that the primary site is about to be hit by a disaster event, it instructs the mirroring application to stop accepting write commands from data sources 24. In some embodiments, the protection processor stops sending acknowledgements to the mirroring application. As a result, the mirroring application stops accepting new write commands from data sources 24. The protection processor can also use the acknowledgement mechanism to control the rate in which write commands are accepted from the data sources after predicting the disaster event.

In some embodiments, in particular when some of the data sent by data sources 24 is considered important for investigating the disaster event, some data sources (e.g., security cameras) may still be allowed to store data while other data sources (e.g., IT systems) may be declined. In these embodiments, data whose storage is allowed to continue is written to secure storage unit 48 until memory 60 is full.

Having detected an approaching disaster event, processor 44 attempts to use the remaining time for transmitting the data cached in units 48 before the disaster event hits the primary site. Processor 44 retrieves the records stored in units 48, at a record retrieval step 124. Processor 44 then checks whether the primary communication connection with the secondary site (i.e., communication link 40) is still operative, at a primary communication checking step 126. As long as link 40 remains operative, processor 44 uses this link to transmit the records to the secondary site, at a primary transmission step 128.

Otherwise, if the primary link is already inoperative, processor 44 instructs units 48 to transmit the records using the alternative communication link, i.e., using wireless transmitters 76, at an alternative transmission step 130. Additionally or alternatively, as noted above, if a particular unit 48 senses a loss of communication and/or electrical power, it begins transmitting the records stored in memory 60 using transmitter 76.

Although the embodiments described herein mainly address the use of a secure storage unit for guaranteed mirroring of data, the methods, systems and devices described herein can also be used in additional applications. For example, in some systems data is being backed-up periodically to a storage device. A secure storage unit can be used for temporarily and securely storing the data produced in the system between periodic backup operations. This automated mechanism can replace the known practice of manually placing backup tapes or disks in a disaster-proof safe or at a distant location.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data protection, comprising:
   accepting data for storage from one or more data sources;
   sending the data for storage in a primary storage device located at a local site, and in a secondary storage device located at a remote site;
   while awaiting an indication of successful storage of the data in the secondary storage device, temporarily storing a record associated with the data in a disaster-proof storage unit collocated with the primary storage device at the local site; and
   when an event damaging at least some of the data in the primary storage device occurs, reconstructing the data using the record stored in the disaster-proof storage unit and at least part of the data stored in the secondary storage device.

2. The method according to claim 1, wherein temporarily storing the record comprises sending an acknowledgement to the one or more data sources responsively to a successful caching of the record in the disaster-proof storage unit, without waiting to receive the indication of the successful storage of the data in the secondary storage device, so as to reduce a transaction latency associated with the storage of the data.

3. The method according to claim 1, wherein temporarily storing the record comprises receiving an acknowledgement from the secondary storage device acknowledging the successful storage of the data in the secondary storage device, and deleting the record from the disaster-proof storage unit responsively to the acknowledgement.

4. The method according to claim 1, wherein reconstructing the data comprises retrieving the disaster-proof storage unit following the event, extracting the record from the disaster-proof storage unit and writing the data associated with the record to the secondary storage device.

5. The method according to claim 4, wherein writing the data comprises remotely connecting the disaster-proof storage unit to the secondary storage device.

6. The method according to claim 1, wherein the disaster-proof storage unit comprises a removable memory device for holding the record, and wherein reconstructing the data comprises, when the disaster-proof storage unit is damaged by the event, removing the memory device from the disaster-proof storage unit and installing the memory device in another unit for readout of the record.

7. The method according to claim 1, and comprising detecting the event using a detection mechanism in the disaster-proof storage unit, and modifying operation of the disaster-proof storage unit responsively to detecting the event.

8. The method according to claim 7, wherein detecting the event comprises detecting at least one of a loss of external electrical power supply and a communication failure at the disaster-proof storage unit.

9. The method according to claim 7, wherein modifying the operation comprises transmitting the record from the disaster-proof storage unit over a wireless communication link.

10. The method according to claim 9, wherein temporarily storing the record comprises storing the record in two or more disaster-proof storage units, and wherein transmitting the record comprises transmitting two or more different parts of the record respectively from the two or more disaster-proof storage units over respective wireless links so as to shorten a transmission time of the record.

11. The method according to claim 7, wherein modifying the operation comprises transmitting a homing signal from the disaster-proof storage unit, so as to enable location and retrieval of the disaster-proof storage unit.

12. The method according to claim 1, wherein reconstructing the data comprises:
sensing an environmental condition using an environmental sensor;
prior to occurrence of the event, predicting the event responsively to the sensed environmental condition; and
after predicting the event, transmitting the record from the disaster-proof storage unit using at least one of a wired connection and a wireless connection.

13. The method according to claim 12, wherein sensing the environmental condition comprises accepting a manual indication from a user that indicates the event.

14. The method according to claim 12, wherein temporarily storing the record comprises sending an acknowledgement message responsively to a successful storage of the record in the disaster-proof storage unit, and comprising, after predicting the event, refraining from sending subsequent acknowledgement messages so as to avoid accepting additional data from the one or more data sources.

15. The method according to claim 12, and comprising, after predicting the event, refraining from sending subsequent data for storage in the primary storage device.

16. The method according to claim 12, wherein the one or more data sources comprise at least two data sources, and comprising, after predicting the event, temporarily storing in the disaster-proof storage unit only subsequent records associated with data originating from a subset of the at least two data sources.

17. The method according to claim 1, wherein temporarily storing the record comprises avoiding exceeding a memory capacity in the disaster-proof storage unit by matching the memory capacity with at least one of a maximum allowed size of data pending for acknowledgement by the secondary storage device and a maximum number of write commands pending for storage in the secondary storage device.

18. The method according to claim 1, wherein temporarily storing the record comprises including in the record additional information related to the data, the additional information comprising at least one of an address of an originating data source, an address of the primary storage device, a time stamp indicating an acceptance time of the data and a storage address intended for the data in the primary storage device.

19. A system for data protection, comprising:
one or more data sources, which are arranged to send data for storage;
primary and secondary storage devices, which are located in a local site and a remote site, respectively, and are arranged to hold the data; and
a disaster-proof storage unit, which is collocated with the primary storage device at the local site and which is arranged to temporarily store a record associated with the data while awaiting an indication of a successful storage of the data in the secondary storage device, and when an event damaging at least some of the data in the primary storage device occurs, to provide the record so as to enable reconstruction of the data using the record stored in the disaster-proof storage unit and at least part of the data stored in the secondary storage device.

20. The system according to claim 19, and comprising:
an environmental sensor, which is arranged to sense an environmental condition in a vicinity of the primary storage device; and
a processor, which is arranged to predict the event, prior to occurrence of the event, responsively to the sensed environmental condition and, after predicting the event, to instruct the disaster-proof storage unit to transmit the record using at least one of a wired connection and a wireless connection.

21. Apparatus for protecting data sent for storage in primary and secondary storage devices, comprising:
a disaster-proof storage unit, which is collocated with the primary storage device at a local site and which comprises:
a disaster-proof enclosure, which is arranged to protect components contained therein against disaster events;
a memory device contained in the enclosure, which is arranged to temporarily hold a record associated with the data while awaiting an indication of successful storage of the data in the secondary storage device; and
a control unit, which is arranged, when an event damaging at least some of the data in the primary storage device occurs, to provide the record so as to enable reconstruction of the data using the record stored in the memory device and at least part of the data stored in the secondary storage device;
a sensor, which is arranged to sense an environmental condition in a vicinity of the primary storage device; and
a protection processor, which is arranged to predict the event, prior to occurrence of the event, responsively to the sensed environmental condition and, responsively to predicting the event, to instruct the disaster-proof storage unit to transmit the record so as to protect the data.

22. The apparatus according to claim 21, wherein the control unit is arranged to delete the record from the memory device responsively to an acknowledgement from the secondary storage device acknowledging the successful storage of the data in the secondary storage device.

23. The apparatus according to claim 21, wherein the control unit is arranged to communicate with the secondary storage device in order to provide the record so as to reconstruct the data.

24. The apparatus according to claim 21, wherein the memory device comprises at least one of a non-volatile memory device and a removable memory device.

25. The apparatus according to claim 21, wherein the control unit comprises a detection mechanism for detecting the event, and wherein the control unit is arranged to modify operation of the disaster-proof storage unit responsively to detecting the event.

26. The apparatus according to claim 25, wherein the detection mechanism is arranged to detect at least one of a loss of external electrical power supply and a communication failure at the disaster-proof storage unit.

27. The apparatus according to claim 25, wherein the disaster-proof storage unit further comprises a wireless transmitter, which is arranged to transmit the record from the disaster-proof storage unit responsively to detecting the event.

28. The apparatus according to claim 27, wherein the disaster-proof storage unit is one of two or more disaster-proof storage units, which are arranged to transmit respectively two or more different parts of the record over respective wireless links so as to shorten a transmission time of the record.

29. The apparatus according to claim 25, wherein the disaster-proof storage unit further comprises a homing device, which is arranged to transmit a homing signal from the disaster-proof storage unit responsively to detecting the event, so as to enable location and retrieval of the disaster-proof storage unit.

30. The apparatus according to claim 21, wherein the record comprises additional information related to the data, the additional information comprising at least one of an address of an originating data source, an address of the primary storage device, a time stamp indicating an acceptance time of the data and a storage address intended for the data in the primary storage device.

31. The apparatus according to claim 21, wherein the sensor is arranged to accept a manual indication from a user so as to predict the event.

32. The apparatus according to claim 21, wherein the data is accepted from one or more data sources, and wherein the protection processor is arranged to send an acknowledgement message responsively to a successful storage of the record in the disaster-proof storage unit and to refrain from sending subsequent acknowledgement messages after predicting the event so at to avoid accepting additional data from the one or more data sources.

33. The apparatus according to claim 21, wherein the data is accepted from one or more data sources, and wherein the protection processor is arranged to control a rate of the data accepted from the one or more data sources after predicting the event.

34. The apparatus according to claim 21, wherein the data is accepted from at least two data sources, and wherein the protection processor is arranged to send for temporary storage in the disaster-proof storage unit only subsequent records associated with data originating from a subset of the at least two data sources after predicting the event.

35. The apparatus according to claim 21, wherein a capacity of the memory device is matched to a maximum allowed size of data pending for acknowledgement by the secondary storage device so as to avoid exceeding the memory capacity.

* * * * *